US008533902B2

(12) United States Patent
Norell et al.

(10) Patent No.: US 8,533,902 B2
(45) Date of Patent: Sep. 17, 2013

(54) REMOVABLE CIRCUIT BOARD ASSEMBLY FOR A VACUUM

(75) Inventors: Neil N. Norell, Vestal, NY (US); Melvin E. Wolfe, Jr., Kirkwood, NY (US); James M. Robitaille, Montoursville, PA (US); Doug Adams, Newark Valley, NY (US); Jonathan Miller, Williamsport, PA (US)

(73) Assignee: Shop Vac Corporation, Williamsport, PA (US)

( * ) Notice: Subject to any disclaimer, the term of this patent is extended or adjusted under 35 U.S.C. 154(b) by 393 days.

(21) Appl. No.: 13/073,883

(22) Filed: Mar. 28, 2011

(65) Prior Publication Data

US 2011/0232026 A1    Sep. 29, 2011

Related U.S. Application Data

(60) Provisional application No. 61/318,186, filed on Mar. 26, 2010.

(51) Int. Cl.
*A47L 9/28* (2006.01)
(52) U.S. Cl.
USPC .................................. 15/319; 15/391; 15/413
(58) Field of Classification Search
USPC ............................................ 15/319, 391, 413
IPC .......................................................... A47L 9/28
See application file for complete search history.

(56) References Cited

U.S. PATENT DOCUMENTS

| 7,050,929 | B2 | 5/2006 | Norell et al. |
| 7,150,068 | B1 | 12/2006 | Ragner |
| 7,475,450 | B1 | 1/2009 | Ragner |
| 2009/0249580 | A1 | 10/2009 | Charlton et al. |
| 2010/0083457 | A1* | 4/2010 | Norell et al. .................. 15/347 |

FOREIGN PATENT DOCUMENTS

| EP | 0 394 641 A1 | 10/1990 |
| WO | WO-2004/052166 A1 | 6/2004 |

OTHER PUBLICATIONS

International Search Report and Written Opinion for Application No. PCT/US2011/034910 dated Jan. 24, 2012.

* cited by examiner

*Primary Examiner* — David Redding
(74) *Attorney, Agent, or Firm* — Marshall, Gerstein & Borun LLP; Randall G. Rueth (57) ABSTRACT

A vacuum assembly having a housing and a motor and motor shaft secured within the housing; a fan coupled to the motor shaft and an air intake port and an air exhaust port located within the housing; a circuit board mounted in a cooling air path in the housing, wherein the cooling air path is located between the air intake port and the air exhaust port such that the fan causes cool air to flow across the circuit board; a pulley assembly coupled to the motor shaft and including a disposable belt, the pulley assembly located in the housing in such position that the circuit board blocks access to the disposable belt; a first connector portion secured to the circuit board; a second connector portion coupled to a plurality of wires coupled to at least the motor; the first and second connector portions configured to mate in a single direction.

18 Claims, 14 Drawing Sheets

REMOVABLE CIRCUIT BOARD ASSEMBLY FOR A VACUUM

CROSS-REFERENCES TO RELATED APPLICATIONS

The present application claims the benefit of U.S. Provisional Patent Application No. 61/318,186, entitled "Switched Reluctance Motor," filed on Mar. 26, 2010, the entire disclosure of which is hereby incorporated by reference herein. The present application is also related to U.S. patent application Ser. No. 13/072,929, entitled "Torque Based Electronic Pulse Width Modulation Control System for a Switched Reluctance Motor," filed on the same day as the present application, which is hereby incorporated by reference herein in its entirety.

TECHNICAL FIELD

This disclosure relates generally to vacuum cleaner circuit boards and, more particularly, to removable or hinged circuit boards.

BACKGROUND

Vacuum cleaners and other types of machinery utilize circuitry and electrical components for control. This circuitry and electrical components often become heated, and to prevent overheating and/or damage to the components, require cooling. This is particularly true in vacuums utilizing switched reluctance motors. In order to cool these components, they are often secured to one or more circuit boards and placed in a location within the vacuum to be proximate a stream of air flow. However, often times the ideal location for cooling blocks access to other components or systems within the vacuum that require routine or occasional maintenance.

If it is necessary for a consumer of the machinery to move or remove the circuit board(s) to access other components for maintenance or repair, it is important that this may be accomplished without damaging the circuit boards and ensuring that connections to the circuit board(s) are made correctly as an improperly connected circuit board will cause severe damage to several of the electrical components.

BRIEF DESCRIPTION OF THE DRAWINGS

The present patent is illustrated by way of examples and not limitations in the accompanying figures, in which like references indicate similar elements, and in which.

DETAILED DESCRIPTION OF THE EXAMPLES

Figure 1:
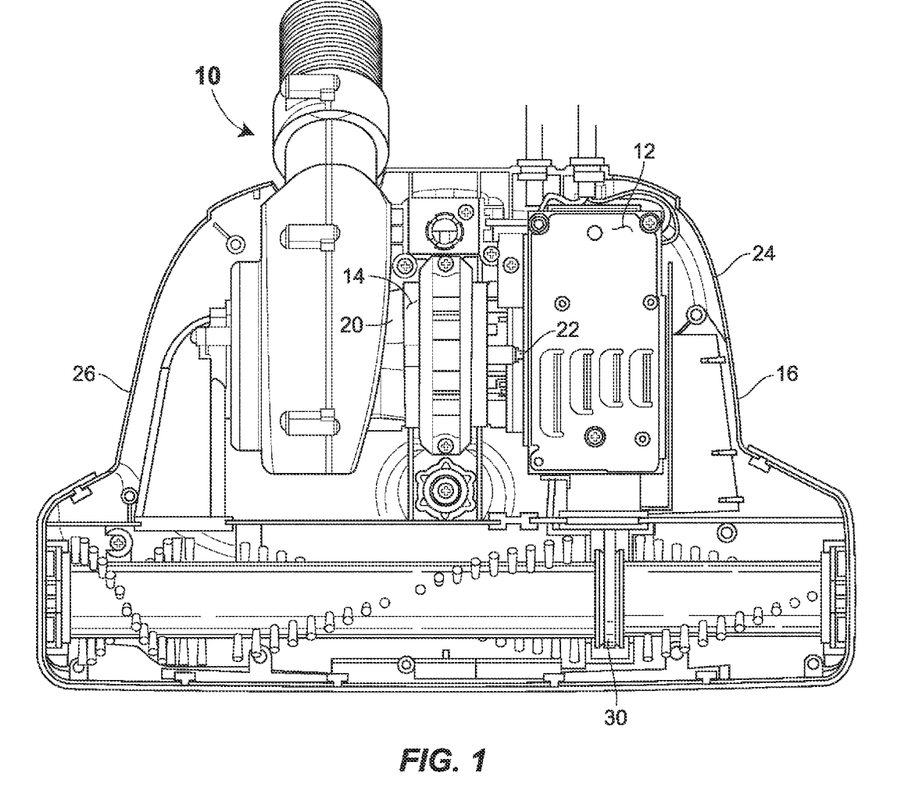
FIG. 1 illustrates a bottom view of an exemplary upright vacuum cleaner after a cover has been removed.

FIG. 1 illustrates a bottom view of an exemplary upright vacuum cleaner 10 after a bottom access cover has been removed, thus making visible a removable circuit board assembly 12. The removable circuit board assembly 12 secures a number of circuits and electrical components which are utilized to power and control the vacuum cleaner 10 as well as a motor 14 within a vacuum housing 16. The removable circuit board assembly 12 will be described in greater detail below, however, as shown, it is mounted within the vacuum housing 16 so that it may be cooled by a cooling fan 20 connected to a rotor shaft 22, which is coupled to the motor 14. Those of ordinary skill in the art will appreciate that the fan need not be connected to the motor 14. Moreover, a separate fan may not be necessary if there is sufficient air moving over the removable circuit board assembly 12. The removable circuit board assembly 12 includes a number of electrical components that generate a substantial amount of heat and need to be cooled to prevent damage thereto.

The removable circuit board assembly 12 is thus positioned within the housing 16 so that it is proximate the vacuum motor 14 which causes air pulled into the housing 16 by the fan 20 to move across the removable circuit board assembly 12. In some embodiments, such as that shown in FIG. 1, the cooling air flow is separate from the dirty air which flows from the floor surface into an attached bag and filter (not shown). The cooling air is thus relatively clean in comparison to the dirty air. The cooling air in FIG. 1 is drawn into the housing 16 at an air intake port 24 and flows across both the removable circuit board assembly 12 and the motor 14 and is discharged from the housing 16 at air exhaust port 26.

To maximize the cooling airflow that the cooling fan 20 draws across the removable circuit board assembly 12, the removable circuit board assembly 12 is positioned close (for example, approximately two inches) to the motor shaft 22. Those of ordinary skill in the art appreciate that the requirements to keep the vacuum housing 16 small, the components within are packed together extremely tightly. It is thus often difficult to position the removable circuit board assembly 12 so that is receives sufficient airflow to cool its components. The removable circuit board assembly 12 is thus also positioned close to the vacuum's disposable brush roll belt 30. In the embodiment shown in FIG. 1, the removable circuit board assembly 12 is positioned between the brush roll belt 30 and the bottom access cover (i.e., the side closest to the floor). The brush roll belt 30 requires periodic replacement by a service technician. As a result, the removable circuit board assembly 12 needs to be moved out of the way to facilitate replacement of the brush roll belt 30. The removable circuit board assembly 12 is thus easily removable with the use of a number of screws and a number of connectors utilizing male and female components.

As discussed in more detail below, the connectors can be designed to allow for easy connection and separation and to prevent the wires from being crossed by a technician during servicing of the vacuum. In other words, the connectors can be designed such that there is only one way to make the connection (i.e., mate in a single direction), thus preventing an incorrect re-connection of the removable circuit board assembly 12. Furthermore, the use of the connectors to completely disconnect the removable circuit board assembly 12 minimizes the amount of stress put on the electrical wires that would otherwise occur if the removable circuit board assembly 12 were merely moved to the side during servicing while the wires remained connected. The design and location of the removable circuit board assembly 12 within the housing 16 thus allows for maximum cooling by the cooling airflow, while still allowing for many years of repeated servicing to replace the disposable brush roll belt 30 without damaging the connections to the removable circuit board assembly 12.

Figure 2:
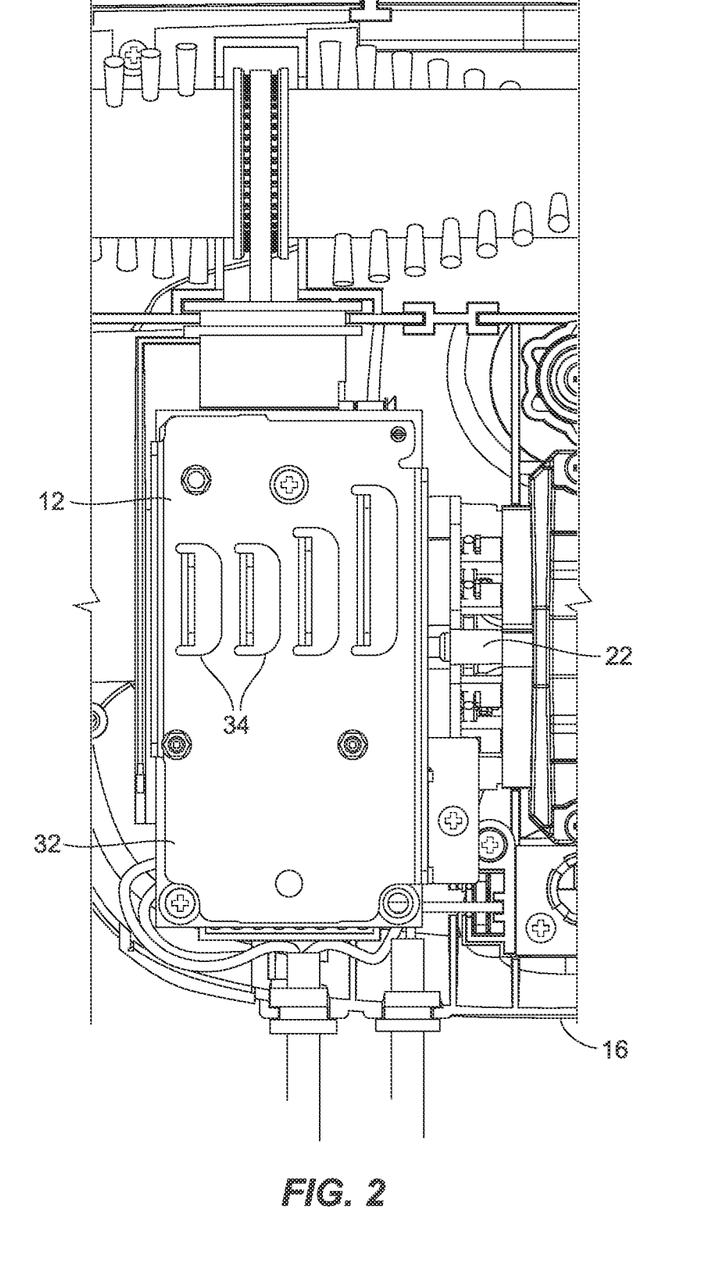
FIG. 2 illustrates a bottom view of a circuit board assembly mounted within a housing.

FIG. 2 illustrates a close up view of the removable circuit board assembly 12 mounted within the housing 16. The bottom portion of the removable circuit board assembly 12 is a heat sink 32, which is used to enhance the cooling of the electrical components connected to the printed circuit board (see FIG. 4). The heat sink 32 may include a plurality of raised cooling fins 34. To further enhance the cooling of the electrical components, the cooling fins 34 may be positioned within the heat sink 32 so that they are generally aligned with the rotor shaft 22. This may result in directing a maximum amount of air pulled in by the fan 20 to flow across the heat sink 32 and attached electrical components.

Figure 3:
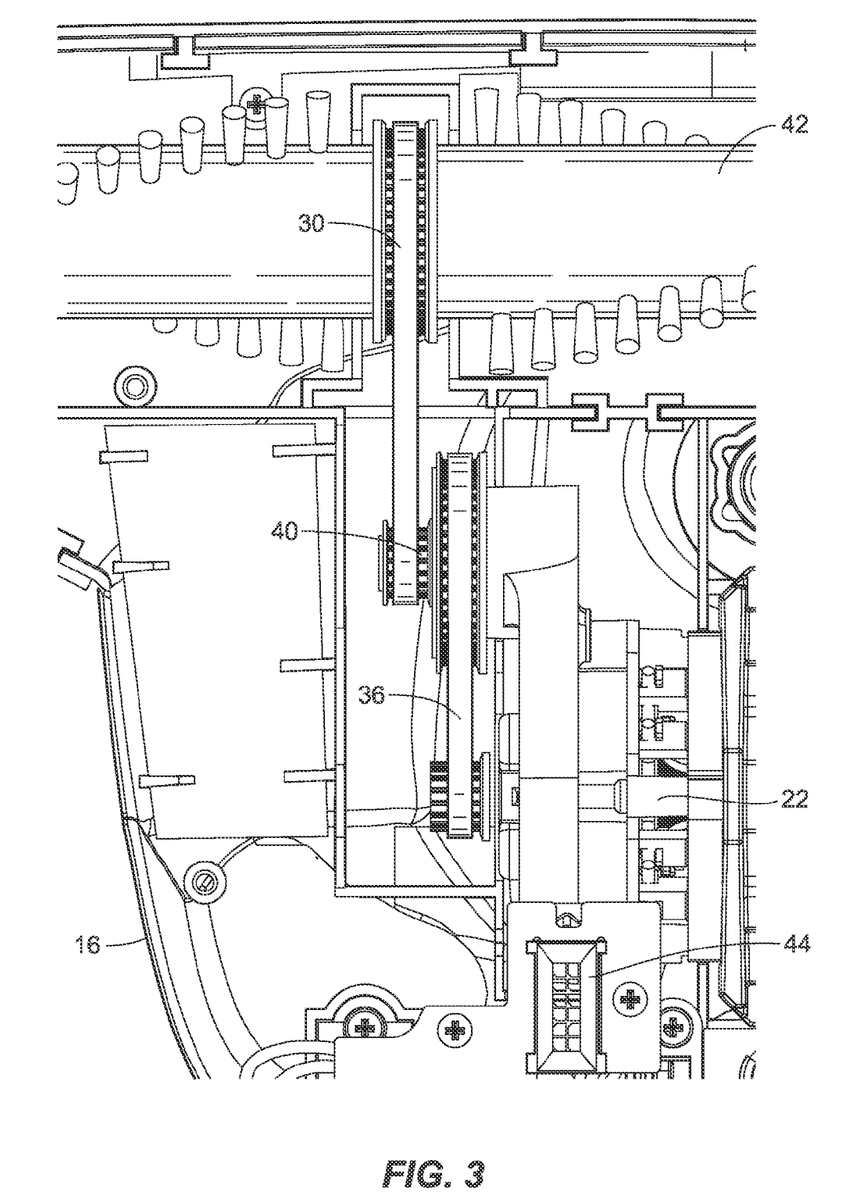
FIG. 3 illustrates an exemplary housing after the circuit board assembly has been removed.

FIG. 3 illustrates an exemplary vacuum housing 16 after the removable circuit board assembly 12 has been removed. As shown, with the removable circuit board assembly 12 removed, service may easily be provided to the disposable brush roll belt 30 and a second motor drive belt 36. The pulley assembly also includes an intermediate pulley 40 which connects the brush roller 42 to the motor shaft 22 via the brush roll belt 30 and the motor drive belt 36. Also illustrated in FIG. 3 is the female half of connector 44. This connector 44 is fixed to the housing 16 and is used to couple the electrical components on the removable circuit board assembly 12 to one or more Light Emitting Diodes used to communicate information to a user of the vacuum and a switch on a handle of the vacuum to allow the user to select between a plurality of available speeds. The connector 44 may alternatively or additionally be used to connect the removable circuit board assembly 12 to the motor 14.

Figure 4A:
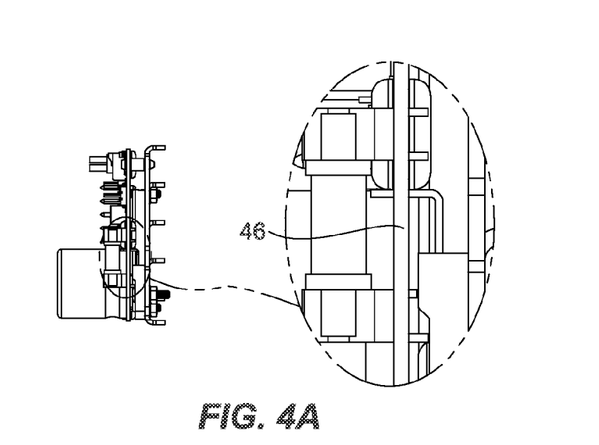
FIGS. 4 and 5 illustrate several views of an exemplary circuit board assembly.
Figure 4B:
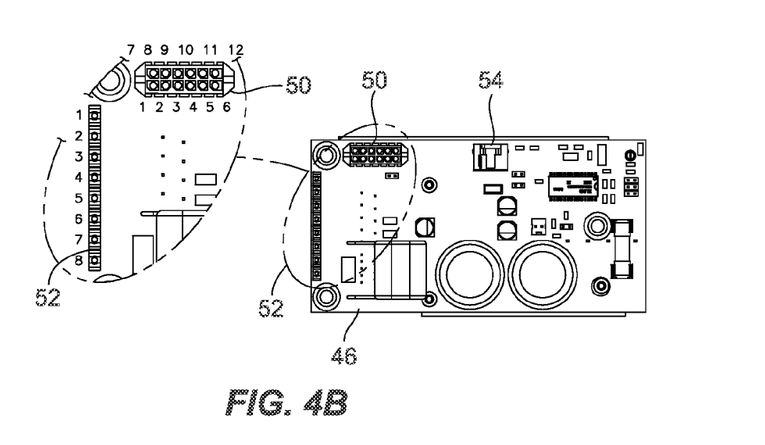
Figure 4C:
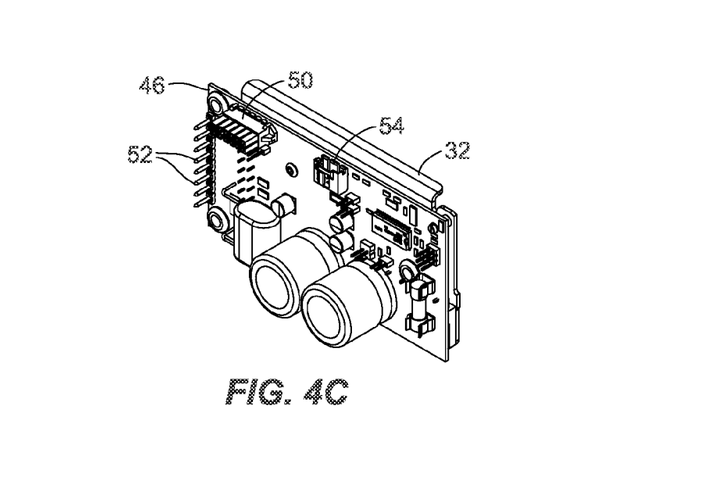
Figure 5A:
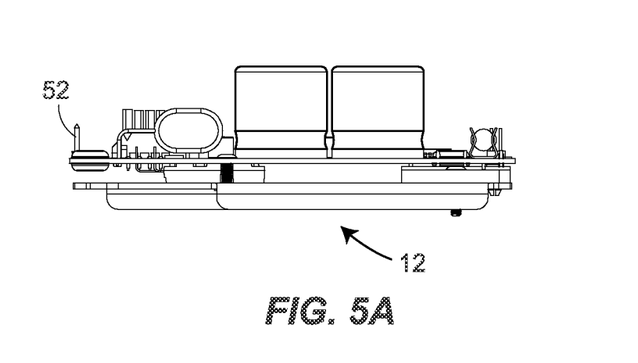
Figure 5B:
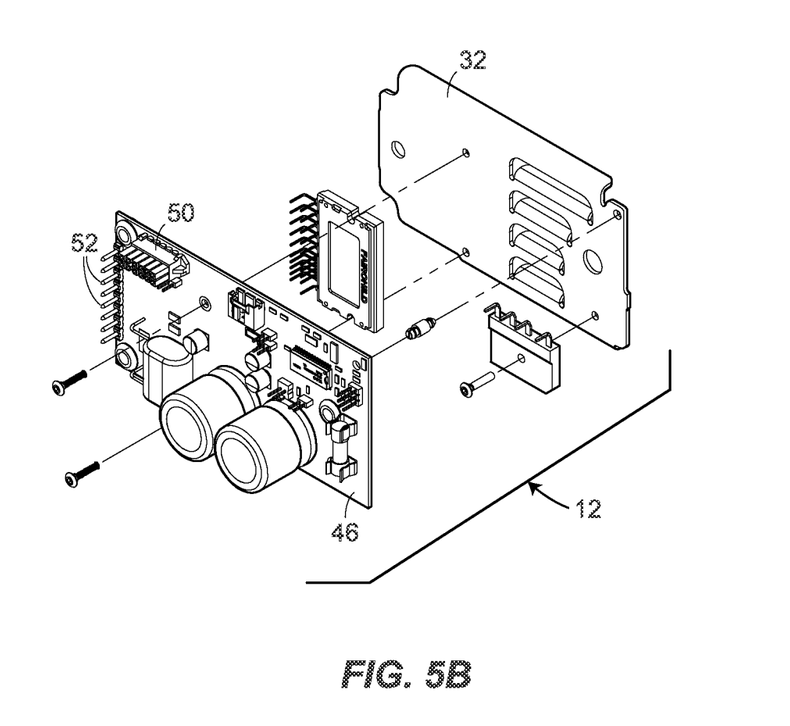

FIGS. 4 and 5 illustrate several views of the removable circuit board assembly 12. Most of these views show the top side (side opposite the heat sink 32) of the removable printed circuit board 46. The removable printed circuit board 46 includes the second half 50 of the connector that mates with connector 44. The connector 50 is fixed to the removable printed circuit board 46 and is the male half of the connector. A plurality pins 52 are also fixed to the removable printed circuit board 46 for connection to a headlight, high voltage DC phase outputs and a 50/60 HZ input. Connector 54 is also shown for connections to the optical switch assembly. The connectors 50, 52 and 54 may be considered the first portion of a connector that is configured to mate or engage with a second portion of the connector to prevent incorrect coupling of the removable printed circuit board 46. In conventional configurations, these pins are mounted perpendicular to the circuit board 46.

Figure 6:
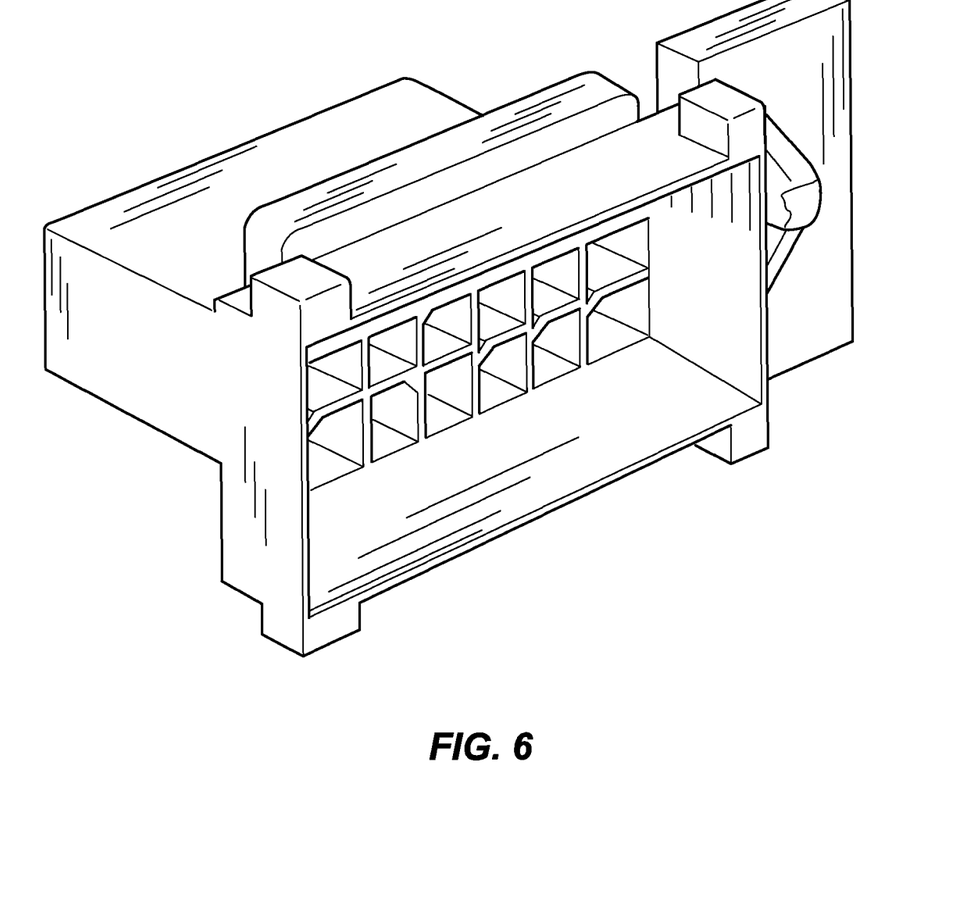
FIGS. 6 and 7 illustrates two halves of an exemplary connector.
Figure 7:
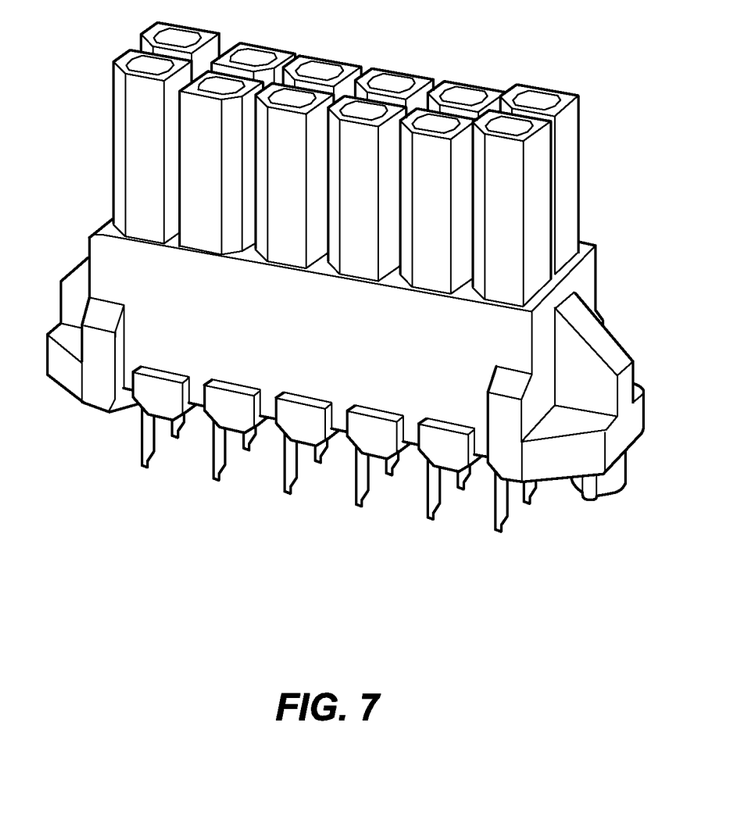

FIG. 6 illustrates an example of a first portion 44 of a connector and FIG. 7 illustrates an example of the second portion 50 of connector. The connector is configured to mate or engage in a singular direction to prevent incorrect coupling of the conductors when the removable printed circuit board 46 is re-connected.

Figure 8:
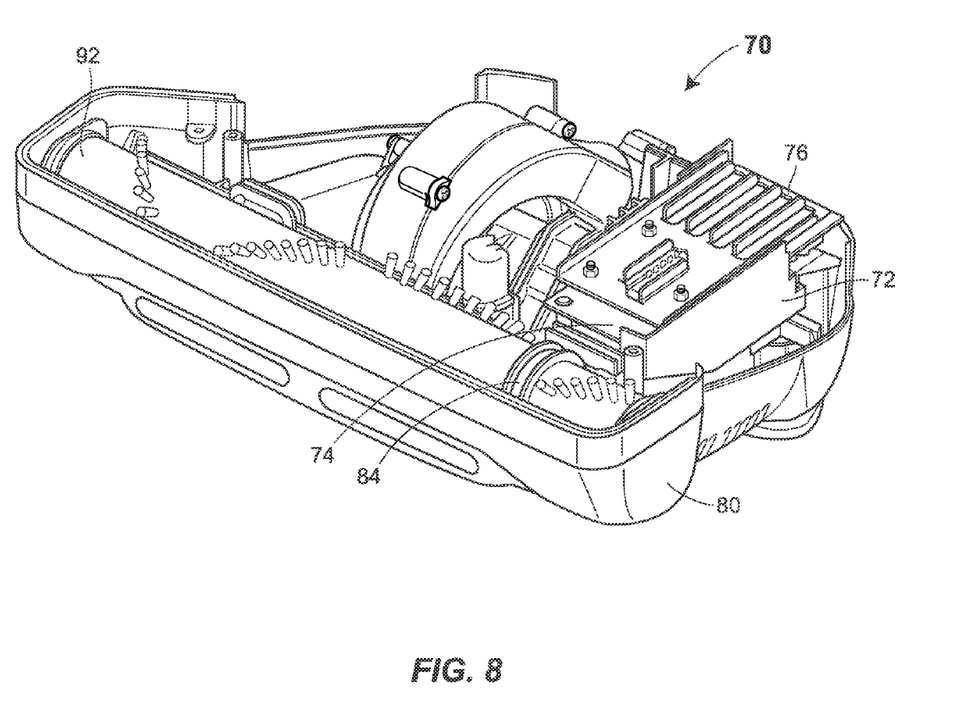
FIG. 8 is a perspective view of a bottom of an exemplary upright vacuum cleaner after a bottom access cover has been removed.

FIG. 8 is a perspective view of a bottom of an exemplary upright vacuum cleaner 70 after a bottom access cover has been removed illustrating a tiltable circuit board assembly 72.

Figure 9:
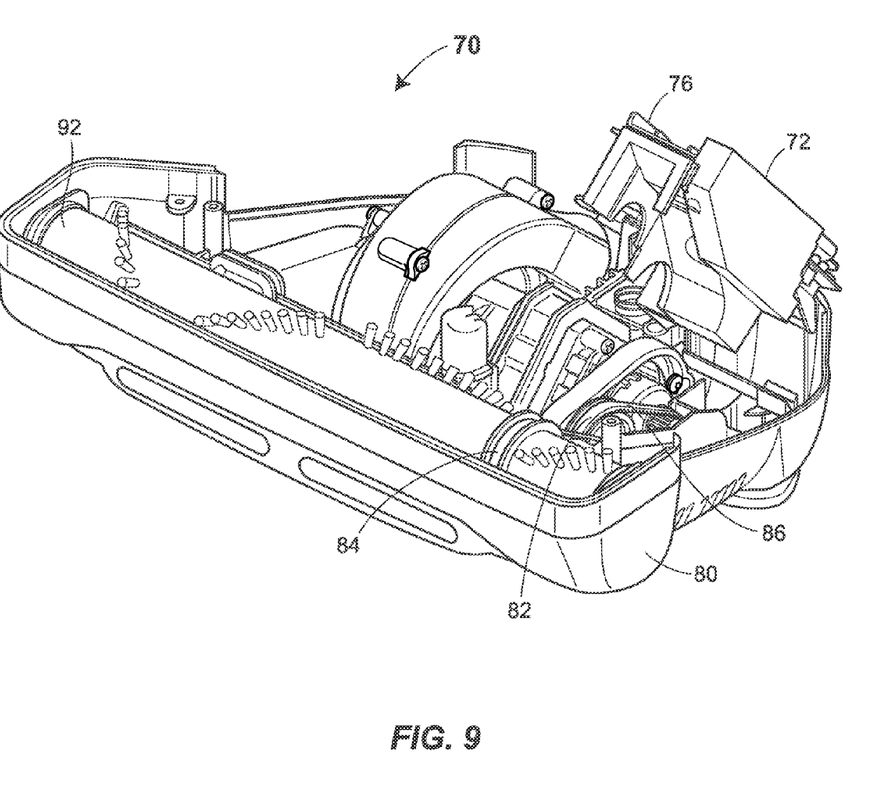
FIG. 9 is a perspective view of a bottom of an exemplary upright vacuum cleaner after a circuit board has been tilted to a second open position.

The tiltable circuit board assembly 72 includes a tiltable printed circuit board 74 and a heat sink 76. When the tiltable circuit board assembly 72 is in a first or closed position as illustrated in FIG. 8, it is positioned within a cooling air path within a housing 80. The cooling air path may be located between a clean air intake port and an exhaust port in the housing 80. FIG. 9 is a perspective view of a bottom of upright vacuum cleaner 70 after the tiltable circuit board assembly 72 has been tilted to a second open position. When the tiltable circuit board assembly 72 is tilted to the second open position, access is provided to the pulley assembly 82 to allow a service technician to replace one or more of the disposable belts 84, 86.

Figure 10:
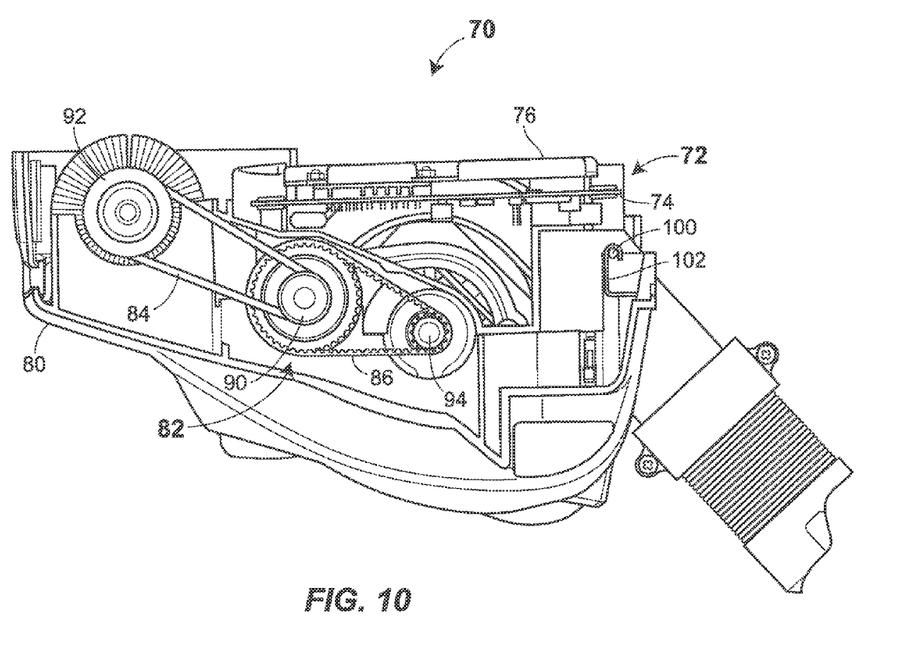
FIGS. 10-12 are a cross-sectional views of an exemplary upright vacuum cleaner with a tiltable circuit board in various positions.
Figure 11:
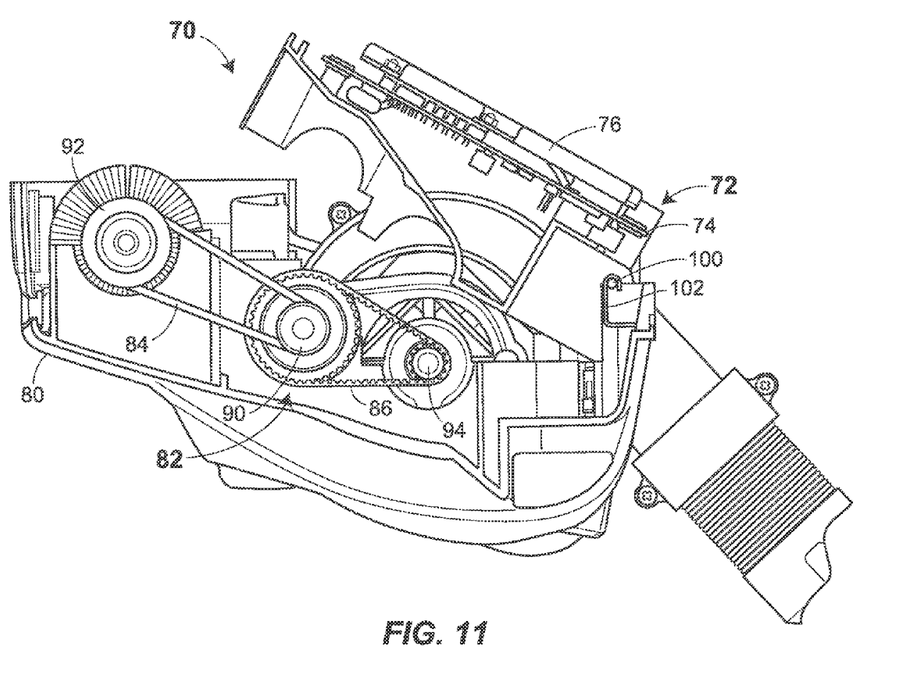
Figure 12:
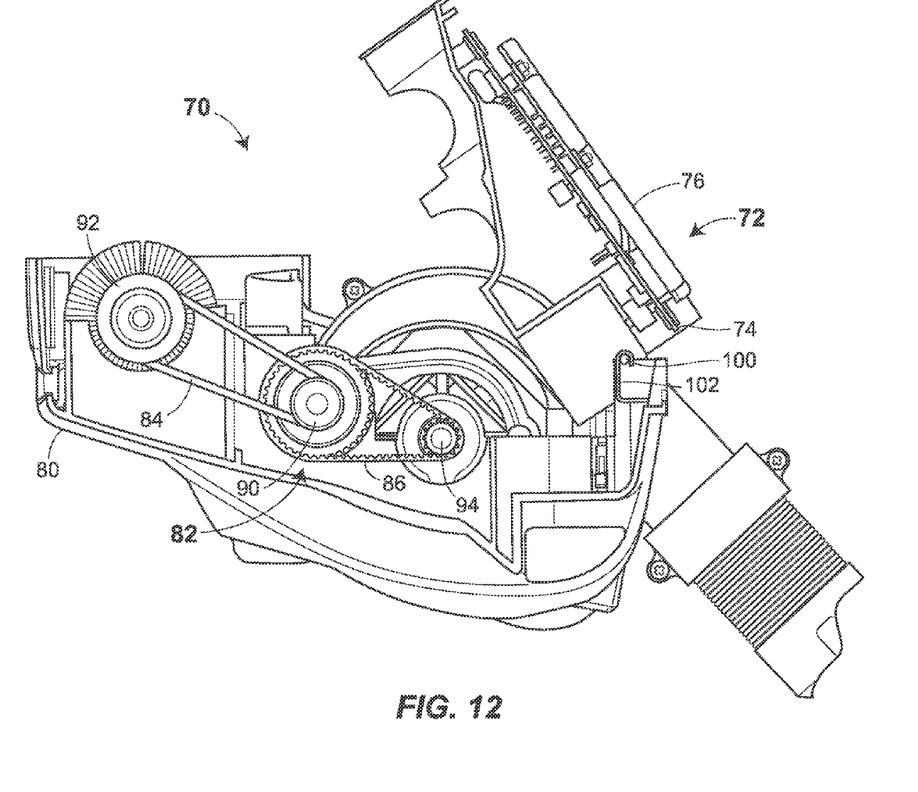

FIGS. 10-12 are a cross-sectional views of an exemplary upright vacuum cleaner 70 with a tiltable circuit board assembly 72 in various positions. The vacuum cleaner includes a pulley assembly 82 including a disposable brush roller belt 84, a motor drive belt 86 and an intermediate pulley 90. The brush roller belt 84 is connected to a brush roller 92 and the motor drive belt 86 is connected to the motor shaft 94. The tiltable circuit board assembly 72 includes a heat sink 76, a printed circuit board 74 and a pulley cover 96. The pulley cover 96 is secured to a pulley cover shaft 100 or has the pulley cover shaft 100 formed integrally therewith. The pulley cover shaft 100 engages a stamped metal hinged portion 102 which is attached to the housing 80 to allow the pivoting of the tiltable circuit board assembly 72, thereby providing access to the pulley assembly 82 which would otherwise be blocked by the tiltable circuit board assembly 72.

Figure 13:
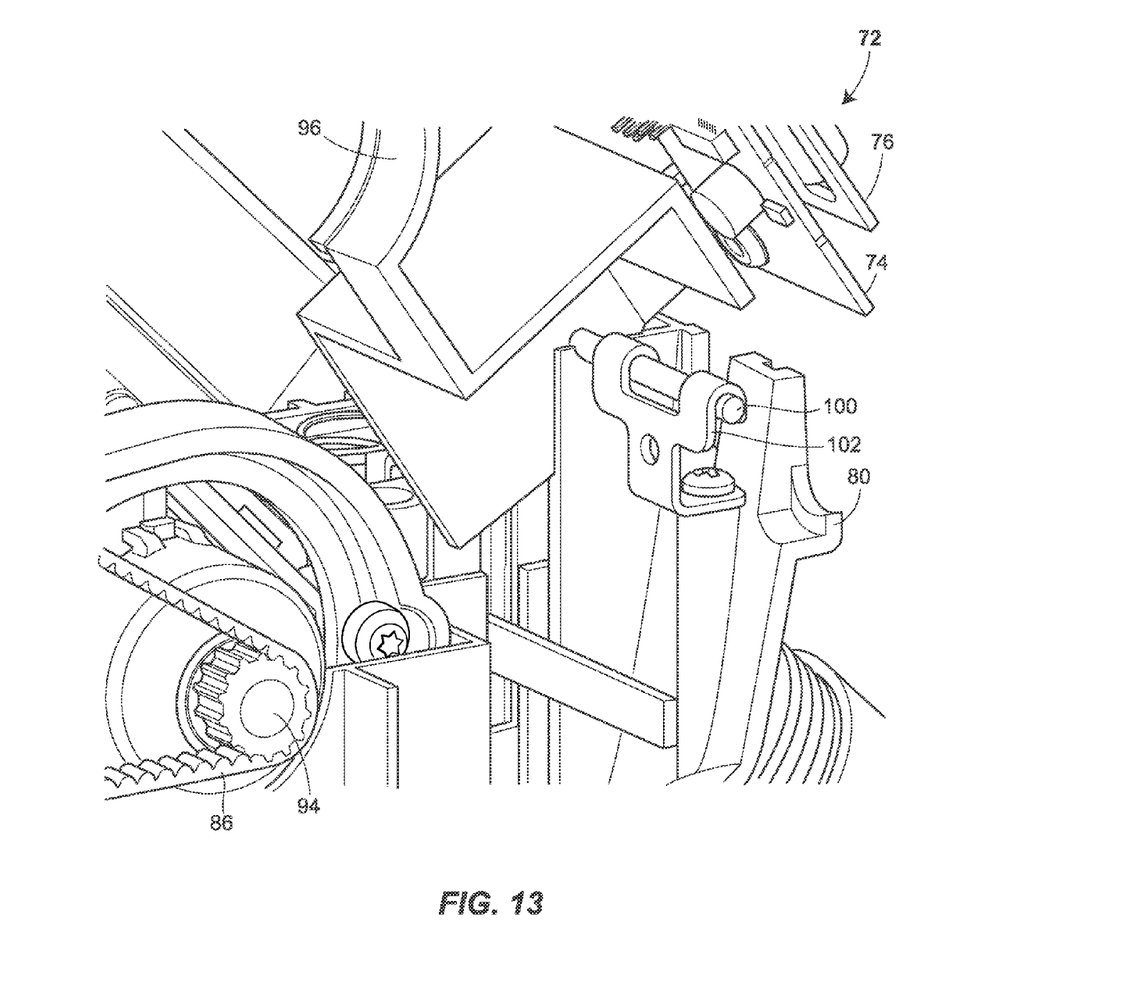
FIG. 13 is a perspective view of a bottom pulley cover and a hinge.
Figure 14:
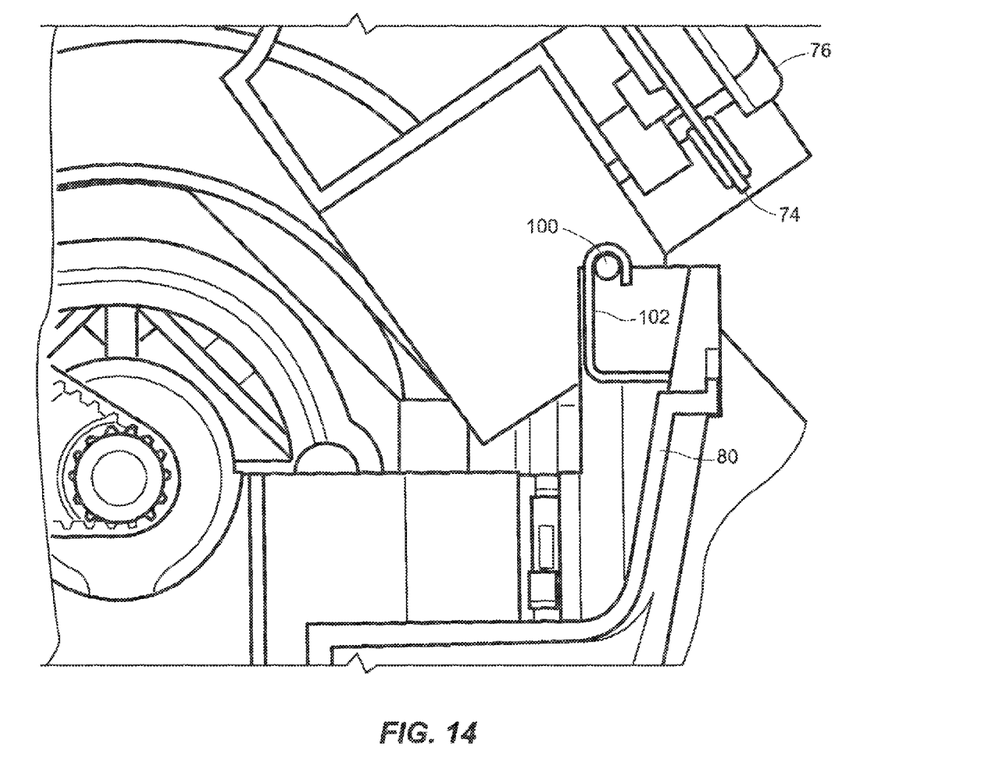
FIG. 14 is a cross-sectional view of a bottom pulley cover and a hinge.

FIGS. 13 and 14 are perspective views of the bottom pulley cover 96, the pulley cover shaft 100 and the hinge portion 102.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A vacuum assembly, comprising:
   a housing and a motor secured within the housing;
   the motor including a motor shaft;
   a fan coupled to the motor shaft and secured within the housing;
   an air intake port and an air exhaust port located within the housing;
   a removable circuit board mounted in a cooling air path in the housing, wherein the cooling air path is located between the air intake port and the air exhaust port such that the fan causes cool air to flow across the removable circuit board to cool a plurality of electrical components secured to the circuit board;
   a pulley assembly coupled to the motor shaft and including a disposable belt, the pulley assembly located in the housing in such position that the removable circuit board blocks access to the disposable belt;

a first connector portion secured to the removable circuit board and electrically coupled to at least a portion of the electrical components secured to the removable circuit board; and a second connector portion coupled to a plurality of wires, wherein the plurality of wires are coupled to at least the motor;

the first and second connector portions configured to mate in a single direction to prevent incorrect coupling of the first and second connector portions after the removable circuit board has been removed to replace the disposable belt.

2. The vacuum assembly of claim 1, wherein the vacuum assembly is an upright vacuum cleaner and further comprising a brush roll coupled to the pulley assembly.

3. The vacuum assembly of claim 1, further comprising a dirty air path separate from the cooling air path.

4. The vacuum assembly of claim 1, wherein the motor is a switched reluctance motor and the electrical components include a controller and a plurality of switching transistors.

5. The vacuum assembly of claim 1, further comprising a bottom access cover, secured to the housing, which when removed, provides access to the removable circuit board, the removable circuit board mounted between the bottom access cover and at least a portion of the pulley assembly.

6. An upright vacuum cleaner, comprising:
a housing and a bottom access cover;
a motor secured within the housing;
the motor including a motor shaft;
a fan secured within the housing;
a removable circuit board mounted in a cooling air path in the housing such that the fan causes cool air to flow across the removable circuit board to cool a plurality of electrical components secured to the removable circuit board, the removable circuit board located proximate the bottom access cover so that the removable circuit board is exposed for removal when the bottom access cover is removed;
a pulley assembly coupling the motor shaft to a brush roller, the pulley assembly including at least one disposable belt, the pulley assembly located in the housing so that the circuit board is between the at least one disposable belt and the bottom access cover thereby necessitating removal of the removable circuit board to replace the at least one disposable belt;
a first connector portion secured to the removable circuit board and electrically coupled to at least a portion of the electrical components secured to the removable circuit board; and
a second connector portion coupled to a plurality of wires, wherein the plurality of wires are coupled to at least the motor;
the first and second connector portions configured to mate in a single direction to prevent incorrect coupling of the first and second connector portions after the removable circuit board has been removed to replace the at least one disposable belt.

7. The upright vacuum cleaner of claim 6, wherein the motor is a switched reluctance motor and the electrical components include a controller and a plurality of switching transistors.

8. The upright vacuum cleaner of claim 6, wherein the fan is coupled to the motor shaft.

9. The upright vacuum cleaner of claim 6, wherein the pulley assembly further comprises two disposable belts and an intermediate pulley, the first disposable belt coupled to the rotor shaft and the intermediate pulley and the second disposable belt coupled to the brush roller and the intermediate pulley.

10. The upright vacuum cleaner of claim 6, further comprising a clean air intake port and a clean air exhaust port in the housing, wherein the cooling air path is located between the clean air intake port and the clean air exhaust port.

11. A machine, comprising:
a housing and a motor secured within the housing;
the motor including a motor shaft;
a fan secured within the housing;
an air intake port and an air exhaust port in the housing;
a removable circuit board mounted in a cooling air path in the housing, wherein the cooling air path is located between the air intake port and the air exhaust port such that the fan causes cool air to flow across the removable circuit board to cool a plurality of electrical components secured to the removable circuit board;
a device located in the housing in such position that the circuit board blocks access to the device;
a first connector portion secured to the removable circuit board and electrically coupled to at least a portion of the electrical components secured to the circuit board; and
a second connector portion coupled to a plurality of wires, wherein the plurality of wires are coupled to at least the motor;
the first and second connector portions configured to mate in a single configuration to prevent incorrect coupling of the first and second connector portions after the circuit board has been removed to service the device.

12. The machine of claim 11, wherein the device is a pulley system that includes a disposable belt.

13. The machine of claim 11, further comprising a dirty air path separate from the cooling air path.

14. An upright vacuum cleaner, comprising:
a housing and a bottom access cover;
a motor secured within the housing;
the motor including a motor shaft;
a fan secured within the housing;
a tiltable circuit board mounted in a cooling air path in the housing such that the fan causes cool air to flow across the tiltable circuit board to cool a plurality of electrical components secured to the tiltable circuit board,
the tiltable circuit board located proximate the bottom access cover so that the tiltable circuit board is exposed for pivoting when the bottom access cover is removed;
the tiltable circuit board secured to a pulley cover, the pulley cover including a pulley cover shaft and configured to shield at least a portion of a pulley assembly;
a hinge portion secured to the housing and configured to engage the pulley cover shaft to allow tilting of the tiltable circuit board; and
the pulley assembly coupling the motor shaft to a brush roller, the pulley assembly including at least one disposable belt, the pulley assembly located in the housing so that the circuit board is between the at least one disposable belt and the bottom access cover thereby necessitating tilting of the tiltable circuit board to replace the at least one disposable belt.

15. The upright vacuum cleaner of claim 14, wherein the motor is a switched reluctance motor and the electrical components include a controller and a plurality of switching transistors.

16. The upright vacuum cleaner of claim 14, wherein the fan is coupled to the motor shaft.

17. The upright vacuum cleaner of claim 14, wherein the pulley assembly further comprises two disposable belts and an intermediate pulley, the first disposable belt coupled to the rotor shaft and the intermediate pulley and the second disposable belt coupled to the brush roller and the intermediate pulley.

18. The upright vacuum cleaner of claim 14, further comprising a clean air intake port and a clean air exhaust port in the housing, wherein the cooling air path is located between the clean air intake port and the clean air exhaust port.

\* \* \* \* \*